US006982695B1

(12) United States Patent  (10) Patent No.: US 6,982,695 B1
Canova, Jr. et al.  (45) Date of Patent: Jan. 3, 2006

(54) METHOD AND APPARATUS FOR SOFTWARE CONTROL OF VIEWING PARAMETERS

(75) Inventors: Francis James Canova, Jr., Fremont, CA (US); Robert Gregory Twiss, Portola Valley, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 09/298,538

(22) Filed: Apr. 22, 1999

(51) Int. Cl.
     *G09G 5/00* (2006.01)
(52) U.S. Cl. .................. 345/156; 345/184; 345/974
(58) Field of Classification Search ............. 345/156, 345/169, 973, 974, 11, 10, 147, 164, 184, 345/173; 348/686
     See application file for complete search history.

(56) References Cited

U.S. PATENT DOCUMENTS

| | | | | |
|---|---|---|---|---|
| 5,153,756 A | * | 10/1992 | Ike .............................. | 359/85 |
| 5,270,821 A | * | 12/1993 | Samuels ...................... | 345/156 |
| 5,613,135 A | * | 3/1997 | Sakai et al. .................. | 395/800 |
| 5,703,616 A | * | 12/1997 | Kawasugi ..................... | 345/98 |
| 5,748,185 A | * | 5/1998 | Stephan et al. ............. | 345/173 |
| 5,751,285 A | * | 5/1998 | Kashiwagi et al. .......... | 345/349 |
| 5,912,663 A | * | 6/1999 | Cheng .......................... | 345/10 |
| 5,943,052 A | * | 8/1999 | Allen et al. .................. | 345/787 |
| 6,002,946 A | * | 12/1999 | Reber et al. ................. | 455/557 |
| 6,121,960 A | * | 9/2000 | Carroll et al. ............... | 345/173 |
| 6,191,785 B1 | * | 2/2001 | Bertram et al. ............. | 345/341 |
| 6,229,456 B1 | * | 5/2001 | Engholm et al. ............ | 345/974 |
| 6,429,846 B2 | * | 8/2002 | Rosenberg et al. ......... | 345/156 |

\* cited by examiner

*Primary Examiner*—Sumati Lefkowitz
*Assistant Examiner*—Alecia D. Nelson

(57) ABSTRACT

The invention provides a method for software contrast control and a portable computer implementing software contrast control. The contrast control is initiated by a single interaction with an input mechanism, for example a pressing of a dedicated contrast control button. The method can be applied more generally to viewing parameters other than contrast such as brightness, color bit depth, color versus monochrome, and screen resolution. The method includes a processor disposed in the portable computer receiving an activation signal from a button or other input mechanism, and displaying viewing parameter adjustment graphics on the image screen. The method continues with the processor receiving a viewing parameter adjustment signal and responding to the adjustment signal by adjusting the viewing parameter levels for the image screen to levels based on the adjustment graphics. The method can include activating the input mechanism by applying a single interaction to thereto prior to the receiving of the activation signal for viewing parameter control. The portable computer can include a display, a contrast control hardware button, a processor, and a memory. The viewing parameter levels vary in response to image screen drive voltages. The processor responds to input applied to the viewing parameter control graphical user interface elements by adjusting the viewing parameters. The applying of the input includes one or more of selecting and adjusting one or more of the viewing parameter control graphical user interface elements.

18 Claims, 3 Drawing Sheets

METHOD AND APPARATUS FOR SOFTWARE CONTROL OF VIEWING PARAMETERS

CROSS REFERENCE TO RELATED APPLICATION

This application relates to and incorporates herein by reference as if fully set forth herein U.S. patent application Ser. No. 09/201,650, entitled "Button Pivot Bar," filed Nov. 30, 1998, having inventors Robert Gregory Twiss, Ricardo A. Penate, Amy Aimei Han, and Traci Angela Neist.

BACKGROUND OF THE INVENTION

1. Field of Invention

The present invention generally relates to control of viewing parameters for an image screen. More particularly, the invention relates to viewing parameter control for a portable computer image screen.

2. Description of Related Art

Effective and easy user control of viewing parameters, such as contrast, for a portable computer image screen is a problem. Previous solutions include a mechanically actuated thumb-wheel (e.g., the PalmPilo™ portable computer and the Palm III™ portable computer) and a mechanically actuated linear "slider" for contrast control. These actuators use mechanical potentiometers to adjust the screen contrast. One disadvantage of the mechanically actuated thumb-wheel solution as used for small, portable devices, such as the Palm III, has been that accidental adjustment of contrast occurs frequently because of contact between the thumb wheel and pockets and/or carrying cases.

The mechanical approaches are also typically complex, have relatively high failure rates and require special manufacturing operations (e.g., hand soldering).

U.S. Pat. No. 5,703,661, issued to Wu on Dec. 30, 1997 describes a device with contrast control. The '661 device provides an on-screen adjustment bar that indicates the status of the adjustment. But, the '661 control apparatus still uses a rotary input signal processor to make the actual adjustment, and therefore does not solve the accidental adjustment problem for portable computers.

None of the prior art apparatus and methods provides contrast control in a portable computer that solves the problem of inadvertant adjustment of the contrast while transporting the portable computer.

SUMMARY OF THE INVENTION

Various embodiments of the invention provide a method for software contrast control and a portable computer implementing the software contrast control. The invention eliminates the problem of inadvertent adjustment that exists for slider and rotary input mechanisms for contrast adjustment of portable computers. Various embodiments of the invention include a portable computer having a dedicated button for activating a graphical contrast control user interface. In other embodiments, the contrast control user interface is replaced by other viewing parameter adjustment user interfaces, or a general viewing parameter adjustment user interface covering more than one viewing parameter. Such an interface can be used to adjust color, resolution and/or brightness of a portable computer. The contrast control can be initiated by a single interaction with a mechanical button, for example a pressing of a dedicated button.

One aspect of the invention provides a method for adjusting contrast levels (or values) for an image screen disposed on a portable computer. The method can be used for adjusting other viewing parameters. The method includes a processor disposed in the portable computer receiving an activation signal from a first input mechanism. The activation signal is for viewing parameter control. Responding to the activation signal, a program for viewing parameter control displays graphical user interface elements for viewing parameter control on the image screen.

The method continues with the processor receiving an adjustment signal indicating adjustment from prior values of the viewing parameter to new values of the viewing parameter. The method continues further with the processor responding to the adjustment signal by adjusting the values of viewing parameter for the image screen to the new values. In some embodiments, the method includes activating a contrast control hardware button by pressing the button one time prior to the receiving of the activation signal. More generally, the activating can include applying a single interaction to a first input mechanism.

A second aspect of the invention provides a portable computer having a contrast control button. Activation of the button causes the contrast control graphical user interface elements to appear. The user can adjust the contrast on the portable computer using one or more of the contrast control graphical user interface elements.

DETAILED DESCRIPTION

Various embodiments of the invention include a method for software control of contrast for a display, and a portable computer implementing software control of contrast. The method and the portable computer can be used for the control of other viewing parameters including brightness, color, image screen resolution, zoom factor, or any other parameter that changes the appearance of information displayed on an image screen. For the embodiments described by FIG. 1 through FIG. 3, the viewing parameter is contrast. Importantly in these embodiments, a single contrast control hardware button on the portable computer is pushed to display a graphical user interface for adjusting contrast. The user can then adjust the contrast using a graphical slider on the portable computer's touch sensitive screen. More generally, software control of a viewing parameter can be initiated by a single interaction with a hardware button, or other input mechanism.

In some embodiments, graphical user interface elements for adjusting the contrast are promptly displayed on the image screen after the user presses the dedicated hardware button. The method can be used for viewing parameters other than contrast as discussed below. The method can be used for any apparatus having an image screen.

From a user interface perspective, previous implementations using only software to adjust viewing parameters often hide the viewing parameter control graphics under multiple layers of menus. Such implementations include contrast, brightness and color adjustment for television and computer monitors, and other apparatus having image screens.

Because prior art contrast control schemes often require navigation through multiple menu selections before a user is able to make the contrast adjustment, these schemes are characterized by a greater likelihood of user error and user frustration. Even worse, the use of multiple menus on a screen with less than optimal contrast, in order to adjust the contrast, can be very difficult. Especially when the contrast is so poor that each menu selection amounts to little more than guesswork.

The problems associated with multiple menu navigation have been overcome by various embodiments of the invention by using a dedicated button on the portable computer that goes directly to the viewing parameter control portion of the software. Additionally, the viewing parameter control application can be implemented in the form of a pop-up menu, which is over-laid "on top of" existing display activity. The pop-up menu provides a single screen for viewing parameter adjustment, instead of requiring navigation through a series of menus. Further, as mentioned below, two means of viewing parameter adjustment input can be provided—either graphical user interfaces disposed on the touch responsive image screen or one or more hardware buttons.

Portable Computer Including Software Viewing Parameter Control

Figure 1:
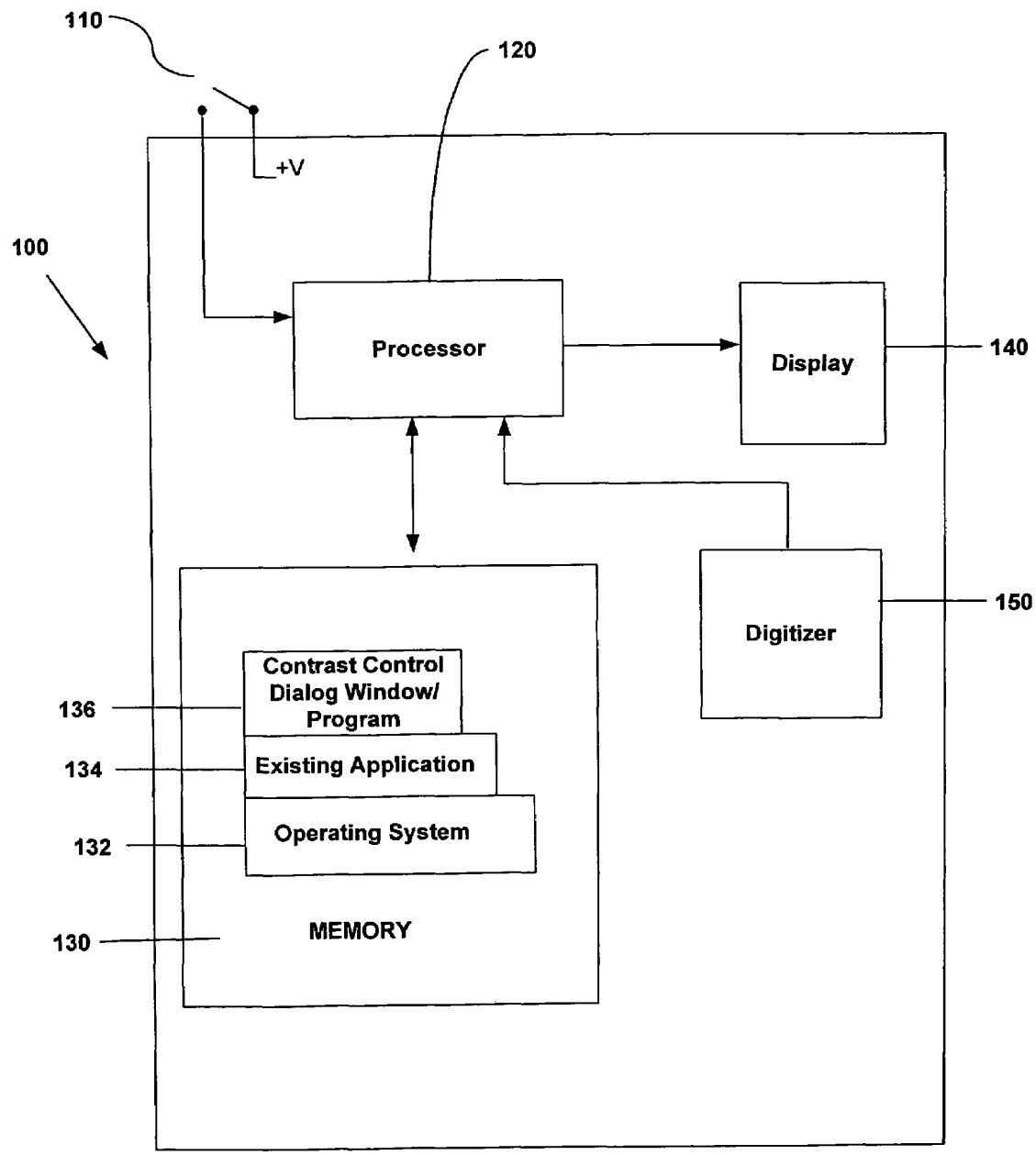
FIG. 1 illustrates a functional block diagram of a portable computer representing an embodiment of the invention.
Figure 2:
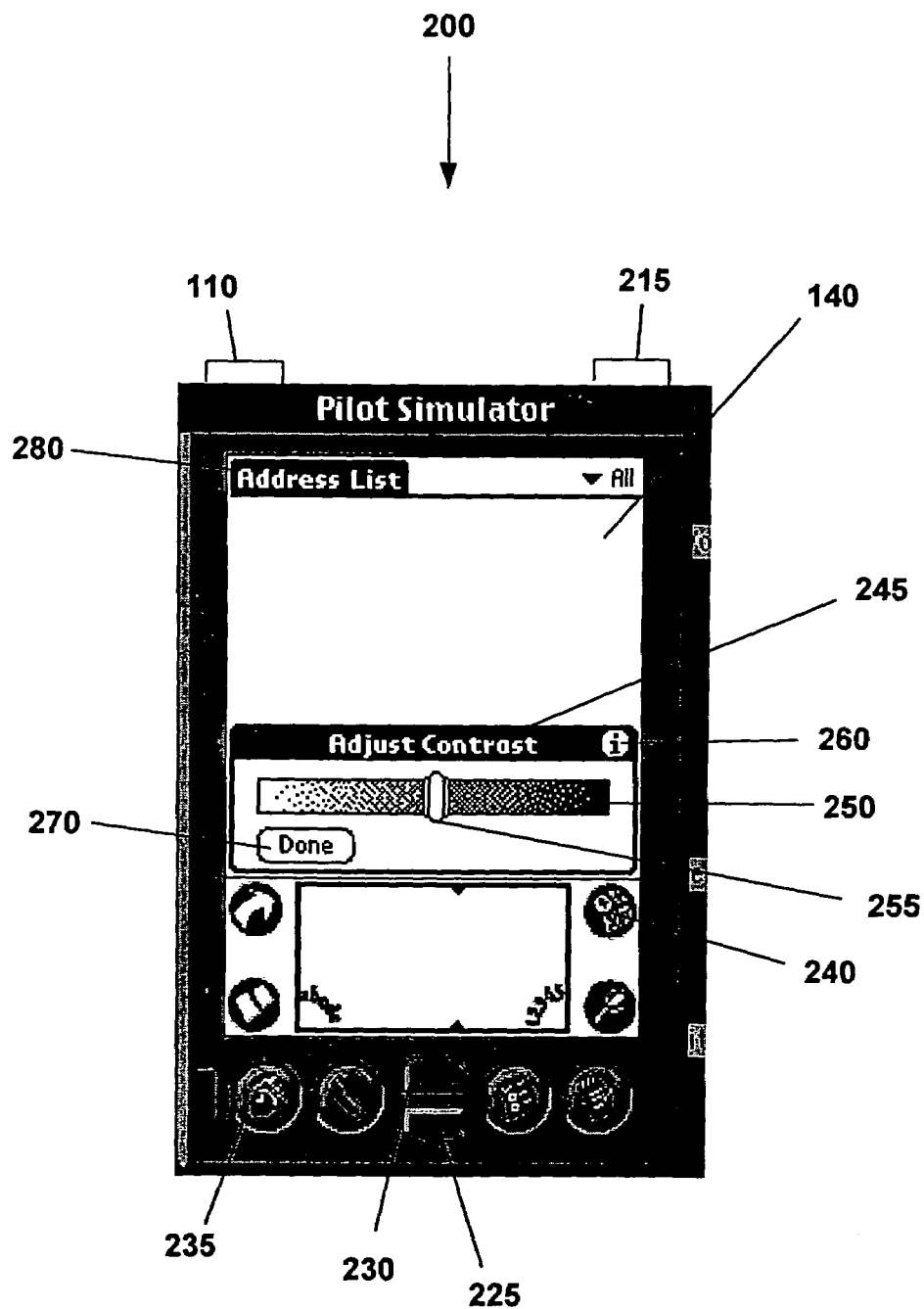
FIG. 2 illustrates a portable computer screen displaying a contrast control dialog window.

Various embodiments of the invention provide a portable computer 100 having software contrast control. In some embodiments, the portable computer can have software control of other viewing parameters performed according to the methods described below in the Example Method for Software Control of Viewing Parameters section. Some embodiments of the portable computer 100 are depicted in FIGS. 1 and 2. FIG. 1 illustrates some components typically disposed in the portable computer 100. FIG. 2 illustrates a portable computer 100 image screen displaying a contrast control dialog window. FIG. 2 is based on the Palm Computing portable computer.

The portable computer 100 can include a contrast control button 110, a processor 120, a memory 130, a display 140, and a digitizer 150. The display 140 can be a touch-sensitive image screen, and is adapted to display items of information at viewing parameter levels. The processor 120 can be a Dragonball™-EZ (MC68EZ328) processor from Motorola, or any other personal systems embedded processor.

The memory 130 can include an operating system 132, an existing application 134, and a contrast control dialog window program 136. The memory 130, including the data and programs stored in the memory, is addressable by the processor 120. In some embodiments of the invention the operating system (OS) 132 comprises the PalmOS™ operating system available from 3Com. In embodiments providing control for a viewing parameter other than contrast, a viewing parameter dialog window program can provide one or more graphic user interface (GUI) elements for control of the corresponding viewing parameter.

The processor 120 and the memory 130 can be coupled to respond to the single interaction with the contrast control button 110 by displaying contrast control GUI elements on the display 140. The processor 120 and the memory 130 can also be coupled to respond to inputs applied to the viewing parameter control GUI elements by adjusting the display 140 drive voltages. The inputs can include one or more of selecting and adjusting one or more of the viewing parameter control GUI elements.

The digitizer 150 can be adapted to respond to contact against the display 140 by sending a signal to the contrast control dialog window program 136. The contrast control dialog window program 136 can be adapted to respond to the signal by adjusting the display 140 drive voltages.

Some embodiments of the portable computer 100 provide software contrast control using the contrast control method described in the Example Method for Software Control of Viewing Parameters section below. In other embodiments, the portable computer is capable of implementing software viewing parameter control for brightness levels, color levels (i.e., color bit depth), color versus monochrome, and screen resolution (number of pixels per inch). Appropriate adjustment of the screen resolution parameter can provide energy savings for low-resolution users and prolong battery life because fewer pixels can be used. One example of a low-resolution user is one that uses graphics such as icons to execute programs on the portable computer. Lower resolution for such users provides for adequate viewing of the icon compared to the resolution level required to view text.

The contrast control button 110 (an example of a "first input mechanism"), is connected to the processor 120 and is adapted to intiate contrast adjustment in response to a single interaction. The contrast control button 110 can comprise a momentary single pole single throw (SPST) switch. The contrast control button 110 can respond to a single pressing by initiating contrast adjustment.

For some embodiments, the SPST switch is adapted to respond to user manipulation thereof by transmitting an activation signal to the contrast control dialog window program 136. The contrast control dialog window program 136 is adapted to respond to the activation signal by displaying a contrast control dialog window on the image screen.

As illustrated in FIG. 2, some embodiments of the portable computer 100 can include a power button 215, a down scrolling button 225, an up scrolling button 230, and a plurality of application buttons 235 (four shown in FIG. 2). The portable computer can also include screen-viewed application buttons 240, an adjustment bar 250, a slider 255, a circle-i button 260, a "done" button 270 and an "Address List" pull-down menu 280.

For some embodiments, the contrast control button 110 is disposed on the outer surface of the portable computer 100 on the left side of the top surface. In other embodiments, the contrast control button can be located on a side surface, the bottom surface, the top surface, or the back surface of the portable computer 100. A single pressing of the contrast control button 110 initiates the contrast control dialog window program 136.

The portable computer 100 can include a digitally controlled circuit adapted to apply the display 140 drive voltages to the pixels. The contrast control dialog window program 136 can be adapted to provide signals to the digitally controlled circuit. These signals can be generated in response to a selection or adjustment of one or more of the viewing parameter control GUI elements.

For embodiments depicted by FIG. 2, after the pressing the contrast control button 110, a contrast control dialog window program 136 causes the display of the software contrast control dialog window 245 on the display 140. If the portable computer 100 is off, then pressing the contrast control button 110 can, in some embodiments, turn the portable computer 100 on as well as cause the software contrast control dialog window 245 to appear on the display 140. The contrast control dialog window 245 typically includes text and one or more viewing parameter control GUI elements. Contrast adjustments are normally caused by applying input to one or more of the contrast control GUI elements.

The display 140 can be a touch sensitive image screen adapted to provide signals to applications in response to contacting or tapping the display. In response to contacting the display 140, the processor 120 can be adapted to send signals to the memory 130, i.e., the contrast control dialog window program 136. As shown in FIG. 2, the viewing parameter control GUI elements can include a virtual slide control, or slider 255, disposed above an adjustment bar 250. In FIG. 2, these viewing parameter control GUI elements are disposed in the contrast control dialog window 245.

The adjustment bar 250 shown in FIG. 2 extends horizontally across approximately 85 percent of the width of the contrast control dialog window 245. The horizontal extent, or length, of the adjustment bar 250 can range from slightly larger than the horizontal extent of the slider 255 to nearly 100 percent of the width of the contrast control dialog window 245. The disadvantage of smaller adjustment bar 250 lengths is that the smaller lengths hinder user ability to make finer adjustments to the contrast.

The adjustment bar 250 can show a gray scale that is lighter at one end of the adjustment bar and becomes darker as the adjustment bar extends to the other end. The gray scale provides the user with an on-screen indication of the direction of the contrast adjustment resulting from a particular movement of the slider 255.

The slider 255 is disposed above the adjustment bar 250, so that the adjustment bar portion disposed directly below the slider is covered by the slider. For the embodiment shown in FIG. 2, the slider 255 inlcudes a "thumb" graphic that is similar in appearance to sliders used for car ventilation system controls and audio equalizers. The slider 255 shown in FIG. 2 has a horizontal extent, or width, that is typically smaller than the length of the adjustment bar 250. But, the slider 255 width is sufficiently large to enable a user to easily interact with the slider. The slider 255 shown in FIG. 2 extends farther both upwards and downwards than the adjustment bar 250.

The slider 255 is typically adjusted by contacting the display 140 with a stylus, pen, finger or any other implement capable of contacting the display 140 with reasonably accurate location precision. Contacting the display 140 to the left of the slider 255 can decrease the contrast incrementally, and contacting the display 140 to the right of the slider can increase the contrast incrementally.

Holding the implement down on the adjustment bar 250 causes the slider 255 to repeatedly move toward the location at which the implement is in contact with the dislplay 140 until the slider moves directly under the implement. When an implement touches the display 140 directly above the slider 255, the slider can be dragged by movement of the implement as long as the implement maintains contact with the display.

When the viewing parameter setting reaches a minimum or a maximum value, the viewing parameter can no longer be adjusted past the extreme value, and a warning sound is produced for some embodiments of the invention. The use of a warning sound is especially useful for informing the user of the extreme viewing parameter situation, because the display 140 can be difficult to view at either of the extreme viewing parameter settings.

For the embodiment shown in FIG. 2, the contrast control dialog window 245 also includes the circle-i button 260 and the dialog "done" button 270.

In some embodiments, contacting the dialog "done" button 270 causes the portable computer 100 to remove the contrast control dialog window 245 from the display 140 and to exit the contrast control dialog window program 136. Also, contacting one of the screen-viewed application buttons 240, such as the application launcher icon, the menu icon, the calculator icon, or the find icon, causes dismissal of the contrast control dialog window program 136. The contrast control dialog window program 136 is also dismissed by a second pressing of the contrast control button 110.

Note that when the contrast control dialog window 245 is provided on the display 140, contacting the display anywhere other than the adjustment bar 250, the slider 255, the dialog "done" button 270, or the circle-i button 260 can cause the portable computer 100 to emit a beep. The beep can be provided by a viewer module of the portable computer 100, and assists the user in locating the slider 255 and the adjustment bar 250 when these viewing parameter control GUI elements are not observable on the display 140.

The portable computer 100 can use other input mechanisms (e.g., up scrolling button 230 and down scrolling button 225) to adjust the viewing parameters. The other input mechanisms can be adapted to respond to inputs applied thereto by providing indications of viewing parameter level (or value) adjustment to the contrast control dialog window program 136. Responsive to the input applied to the other input mechanisms, the contrast control dialog window program 136 causes an adjustment of the viewing parameter level.

For user convenience and for conditions where on-screen viewing parameter control is not possible due to low battery or any other inadequate display condition, an optional backup user contrast adjustment can be performed using the second input mechanism. The second input mechanism can be one or more hardware buttons. For some embodiments as shown in FIG. 2, the viewing parameter adjustment hardware buttons are the up scrolling button 230 and down scrolling button 225.

Example Method for Software Control of Viewing Parameters

Figure 3:
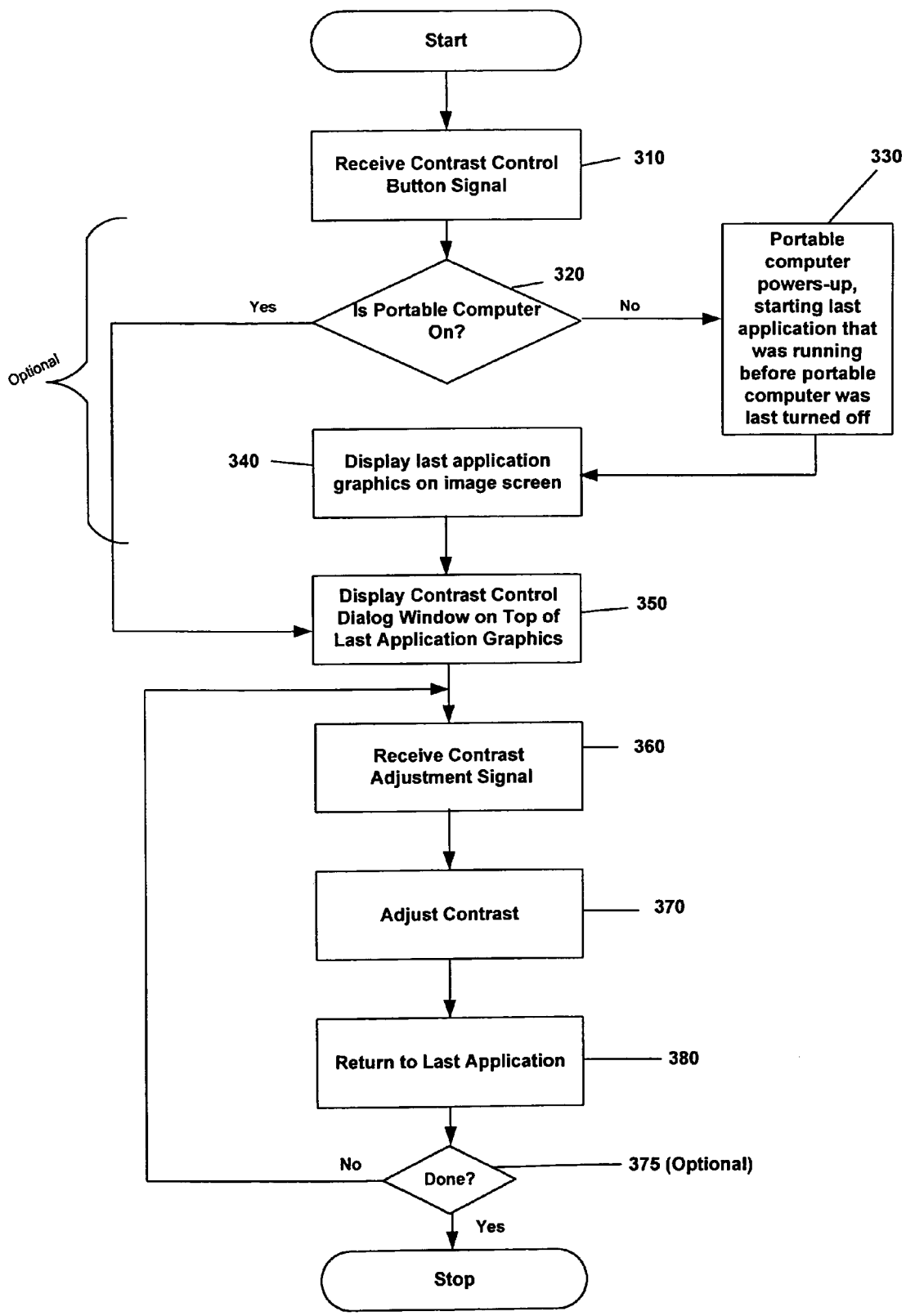
FIG. 3 shows a flow diagram illustrating a method of viewing parameter control representing an embodiment of the invention.

Various embodiments of the contrast control method 300 are depicted in FIG. 3. The contrast control method 300 includes the processor 120 receiving a contrast control button signal (block 310) from the contrast control button 110. The button signal acts as an activation signal for contrast control. The location of the contrast control button 110 for some embodiments is shown in FIG. 2. In other embodiments, the contrast control button 110 can be replaced by any input mechanism capable of providing an activation signal to the processor 120.

The contrast control dialog window program 136 responds to the activation signal by displaying (at block 350) the contrast control dialog window 245 on the display 140. The contrast control dialog window 245 can include a slider 255 coupled to an adjustment bar 250.

In some embodiments, the processor 120 receives a contrast adjustment signal (at block 360) indicating adjustment from prior contrast levels to adjusted levels. In other embodiments, the adjustment signal can relate to a different viewing parameter.

The processor 120 responds to the adjustment signal by adjusting the contrast levels for the display 140 to the adjusted levels at block 370. For embodiments where the adjustment signal corresponds to a viewing parameter other than contrast, the processor 120 adjusts the levels of the corresponding viewing parameter to the adjusted levels.

In some embodiments, the contrast control method 300 includes activating the contrast control button 110 by a single pressing of the contrast control button prior to the receiving of the contrast control button signal at block 310. In other embodiments, the viewing parameter control method includes activating a contrast control button 110 by applying a single interaction to the contrast control button 110. The single interaction can include a specified movement for a push-activated switch, a rotation actuated switch, a slide activated switch, or any other activation mechanism.

In some embodiments, the activating occurs after the portable computer 100 has been powered-up. The user can power up the portable computer 100 depicted in FIG. 2 by pressing the power button 215, or one of the application buttons 235, prior to activating the contrast control button 110. Masking the activating signal from the processor 120 when the portable computer is off eliminates the possibility powering up the portable computer 100 by accidentally pressing the contrast control button 110.

In other embodiments, the activating can occur when the portable computer 100 is either powered up, or off. For these embodiments, after receiving the contrast control button signal (at block 310), there is no masking of the activation signal from the processor 120, or the activation signal masking occurs only in certain conditions, e.g., low battery energy. When the portable computer is off, upon receipt of the activation signal, the portable computer 100 determines whether the portable computer is on (at block 320). Activating the contrast control button 110 with the portable computer 100 powered off can result in the portable computer powering-up and starting the last (existing) application 134 that was running before the portable computer was last turned off (at block 330).

The displaying of the contrast control dialog window 245 (at block 350) can include overlaying the contrast control dialog window on top of graphics from the last (existing) application 134 shown on the display 140 prior to the activating. For embodiments where the activation of the contrast control button 110 powers-up the portable computer 100, the portable computer starts the last (existing) application 134 that was running before the portable computer was turned off. The portable computer 100 can then display the existing application 134 graphics on the display 140 (at block 340), before displaying the contrast control dialog window 245 (or other viewing parameter control GUI elements) on top of the last application graphics (at block 350). One example of the overlaying of the contrast control dialog window 245 is shown in FIG. 2, where the last application graphics include the "Address List" pull-down menu 280.

In some embodiments, the portable computer 100 responds to receiving the viewing parameter control activation signal by switching the display 140 to a preset viewing parameter level. For example, the user can select the preset viewing parameter level using a preference setting application to provide a preferred viewing condition. The preset contrast level can be a minimum viewable contrast level, or a maximum viewable contrast level. Using a preset contrast level improves the user experience by enabling the user to proceed with contrast control from a familiar routine starting point. In addition, if the user finds a particular viewing parameter level that provides optimal viewing, the user can set the viewing parameter level for optimal viewing and thereby minimize the need to further adjust the viewing parameter.

Adjustment from prior viewing parameter levels to adjusted viewing parameter levels can be indicated by interaction with one or more of the viewing parameter control GUI elements. The interaction can include selecting or adjusting one or more of the viewing parameter control GUI elements, or a combination of selecting and adjusting one or more of the GUI elements.

The interactions can include tapping the display 140 with an implement on locations disposed on the adjustment bar 250 on either side of the slider 255. The interactions can also include touching the display 140 with an implement directly above the slider 255, and while maintaining contact with the display 140 moving the implement along the adjustment bar 250.

In response to the indicating of the adjustment, the processor adjusts the contrast levels on the display 140 to the adjusted levels (at block 370). In some embodiments, the contrast control dialog window program 136 translates instructions from the user, either via direct adjustment of the slider 255 on a touch sensitive display 140, or via hardware buttons. In response to the user adjustment indications, the processor 120 transmits signals to manipulate digitally controlled electronics that adjust the contrast (at block 370) for the display 140 in accordance with the user's implicit commands. The viewing parameter adjustment can be accomplished by adjusting display 140 drive voltages, e.g., for brightness, color, and contrast viewing parameters.

After the viewing parameter adjustment, a determination can be made regarding the need for further viewing parameter level adjustment (at block 375). If no further adjustment is needed, the portable computer 100 exits the contrast control (viewing parameter) dialog window program 136 and returns to the last application (at block 380). Returning to the last application, at block 380, can be caused by selection of a "done" button 270, shown in FIG. 2, or by pressing the contrast control button 110.

Some embodiments of the portable computer 100 provide a second input mechanism with which the user can interact to provide a contrast adjustment signal, as an alternative to interacting with the viewing parameter control GUI elements. This second input mechanism can be used when the display 140 does not provide an adequate image of the viewing parameter control GUI elements to enable a user to make adjustment thereto, or simply because the user prefers to use the second input mechanism.

The second input mechanism can include the up scrolling button 230 and the down scrolling button 225. The interaction with the second input mechanism occurs after activating the contrast control button 110, and prior to receiving the adjustment signal. The requirement for the interaction to occur after activating the contrast control button 110 arises for embodiments, such as the Palm V™ from 3Com Palm Computing, where the second input mechanism provides signals for different functions when applications different than the existing application are running. The interaction with the second input mechanism causes the processor 120 to receive the adjustment signal at block 360. The processor 120 then sends a signal corresponding to the adjustment signal to the memory 130.

Interacting with the up scrolling button 230 can include a short pressing of the first pressing region e.g., for a period of time less than approximately 500 milliseconds. For some embodiments of the invention provided by Palm Computing, the maximum pressing time for a short pressing can be modified by the user to a value different than 500 milliseconds. The short pressing of the up scrolling button 230 transmits an indication of an incremental upward adjustment of the contrast levels to the contrast control dialog window program 136.

Interacting with the up scrolling button 230 can include a longer pressing of the first pressing region e.g., for a period of time greater than approximately 500 milliseconds. The longer pressing of the up scrolling button 230 transmits an indication of a large upward adjustment of the viewing parameter levels to the contrast control dialog window program 136. The large upward adjustment is more than approximately twice the magnitude of the incremental upward adjustment.

The down scrolling button 225 works in a manner similar to the up scrolling button 130, except to decrease the viewing parameter value.

ALTERNATE EMBODIMENTS

In other embodiments, the second input mechanism can include a rotational input means, or a sliding input means. The input means can include variable potentiometers adapted to provide a signal to the contrast control dialog window program 136 corresponding to the adjusted position of the input means.

In some embodiments, the second input mechanism includes a press and rotate input mechanism adapted to provide a first signal by pressing the press and rotate input mechanism and a second signal (or series of second signals) by rotating the press and rotate input mechanism. One example of a press and rotate input mechanism is the Panasonic EVQWK5001 encoder switch. The press and rotate input mechanism can replace the contrast control button 110 and be located at the top left of the portable computer 100. The first signal can be used as the activation signal for viewing parameter control, and each second signal can provide an adjustment signal for the corresponding viewing parameter.

Alternatively, the press and rotate input mechanism can be disposed on either side of the portable computer 100, and can work in conjunction with the contrast control button. For some of these embodiments the first signal can be the exclusive hardware mechanism for exiting the contrast control dialog window program 136. In other embodiments, either a second pressing of the contrast control button 110, or a pressing of the press and rotate input mechanism can exit the contrast control dialog window program.

When the display of the viewing parameter control GUI elements is adequate, then the contrast adjustment is typically made by interacting with the GUI elements. For some embodiments, the viewing parameter adjustment can be made by interacting with the second input mechanism even when the viewing parameter control GUI elements are adequately displayed.

In an alternate embodiment, the interactions for adjusting the viewing parameter can include selecting one or more viewing parameter control GUI elements, where the elements represent a particular group of viewing parameter settings. A series of such selectable viewing parameter control GUI elements can be provided in a list or a menu. The viewing parameter control GUI elements can be identified on the display 140 using qualitative descriptors, such as maximum contrast, very high contrast, high contrast, midrange contrast, low contrast, etc. Selectable viewing parameter control GUI elements can also be identified on the display 140 using quantitative descriptors such as 100% contrast, 90% contrast, etc. Selection of the appropriate contrast level can be achieved by tapping the display 140 above the corresponding GUI element.

In some embodiments, a rocker switch (not shown) can replace the separate up and down scrolling buttons (225 and 230). Various embodiments of the rocker switch are described in U.S. patent application Ser. No. 09/201,650, filed Nov. 30, 1998 incorporated herein by reference as if fully set forth herein. The rocker switch and the up and down buttons can be integrally formed from a single member. The rocker switch has an integrally formed fulcrum or pivot bar that isolates the movement of each scrolling button to ensure that pressing of the rocker switch does not inadvertently cause simultaneous actuation of both scrolling buttons.

In some embodiments, the back-up user viewing parameter adjustment can be performed using a single hardware button for viewing parameter adjustment. For example, the contrast control button 110 can have three states. The first state can have the viewing parameter control application on with the viewing parameter adjustment hardware button in a viewing parameter increase adjustment mode, i.e., pressing the single viewing parameter adjustment hardware button can only increase the viewing parameter. The second state has the viewing parameter control application on with the hardware button for viewing parameter adjustment in a viewing parameter decrease adjustment mode. The contrast control button 110 can be adapted to respond to a single pressing thereof by merely toggling the state between the increase only and decrease only modes. For this embodiment, two consecutive pressings of the contrast control button 110 are required to reach the third state where the viewing parameter control application is exited.

In some alternate embodiments, the display 140 includes portions adapted for illumination by groups of pixels enabling the contrast control method 300 to apply the contrast (or viewing parameter) adjustments to one or more selected portions of the display 140. The viewing parameter levels can vary in response to display 140 drive voltages. Different groups of the pixels can have different display 140 drive voltages and corresponding viewing parameter levels. A first portion of the display 140 is illuminated by a first group of pixels.

For these embodiments, adjusting the contrast levels, at block 370, can include maintaining the display 140 drive voltages at low levels for one or more of the groups of pixels, and adjusting the display voltages to adjusted voltages corresponding to the graphical user interface adjusted contrast levels for the first group of pixels. The first portion can cover less than approximately twenty-percent of the display 140.

In some embodiments, the portable computer 100 can display selected information only on the first portion. This selective viewing parameter control technique can save power by reducing the drive voltage level to a minimum for most of the display 140 while providing sufficient viewing parameter levels for viewing information displayed in the selected portions, e.g., the first portion.

By providing different viewing parameter levels for different portions of a display 140, the portable computer 100 can provide excellent resolution for portions of the display where such resolution is necessary e.g., small font text and detailed graphics images. At the same time, the portable computer 100 can save battery life, or recharge frequency, by keeping portions of the screen with no images dark.

Some portable computers 100 are connected to multiple screen displays 140. For these portable computers 100, the groups of the pixels can correspond to the different displays 140.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended sub-claims.

What is claimed is:

1. A method executed on a personal digital assistant for adjusting levels of a viewing parameter for an image screen disposed on the personal digital assistant, wherein the image screen includes pixels having output levels, the method comprising:
   detecting an activation signal for viewing a parameter control in response to user operation of a mechanical button disposed on the personal digital assistant;
   in response to receiving the activation signal, displaying one or more graphical user-interface elements, the one or more graphical user-interface elements forming at least a portion of the parameter control on the image screen, the one or more graphical user-interface elements including a bar and a slider;
   detecting an interaction between a user and the one or more graphical user-interface elements, the interaction corresponding to an adjustment of the viewing parameter from a prior value to a new value;
   in response to detecting the interaction, adjusting the value of the viewing parameter for the image screen to the new value, wherein adjusting includes adjusting image screen drive voltages to adjusted voltages based on the new value, the pixels being receptive to the image screen drive voltages so that the pixel output levels respond to the adjusted voltages by providing an adjusted image having an adjusted contrast or brightness;
   wherein detecting an interaction between a user and the one or more graphical user-interface elements includes detecting continuous contact on the image screen of a user-controlled object over the slider along the bar displayed on the image screen, from a first location corresponding to the prior value to a second location corresponding to the new value;
   wherein said personal digital assistant executes an operating system; and
   wherein a process, running on said personal digital assistant and executing under control of said operating system, causes the displaying of said graphical user-interface elements.

2. The method of claim 1, wherein the image screen includes portions adapted for illumination by groups of pixels including a first portion configured for illumination by a first group of pixels, and wherein the adjusting includes:
   maintaining the image screen drive voltages at low levels for one or more of the groups of pixels, and
   adjusting the image screen drive voltages to adjusted voltages corresponding to the new value for the first group of pixels, the first portion covering less than approximately twenty-percent of the image screen, and wherein the method includes the personal digital assistant displaying selected information only on the first portion.

3. The method of claim 1, wherein
   in response to receiving the activation signal, displaying one or more graphical user-interface elements includes displaying an icon, and
   detecting an interaction between a user and the one or more graphical user-interface elements includes detecting the user contacting the icon after moving the slider to the second position; and
   wherein the method further comprises accepting the new value of the viewing parameter for adjusting image screen drive voltages only if the user contacts the icon.

4. The method of claim 1, wherein
   detecting an interaction between a user and the one or more graphical user-interface elements includes detecting the user contacting the bar either to a left side or right side of the slider, wherein contact to one of the left side or right side corresponds to the new value being less than the prior value, and contact to the other of the left side or right side corresponds to the new value being greater than the prior value.

5. A personal digital assistant comprising:
   an image screen comprising pixels, wherein the image screen is adapted to display items of information at levels corresponding to values of a viewing parameter, the values of the viewing parameter vary in response to image screen drive voltages, and different groups of the pixels have different image screen drive voltages;
   a mechanical button that is disposed on the personal digital assistant and that is actuatable to initiate adjustment of viewing parameter values;
   a processor;
   a memory coupled with the processor;
   the processor being configured to:
      execute an operating system;
      run a process under control of said operating system;
      respond to user operation of the mechanical button by displaying graphical user-interface elements adapted for adjusting the viewing parameter values, the graphical user-interface elements including a slider that can move along a bar;
      wherein said process causes the display of the graphical user-interface elements;
      detect a continuous physical contact applied to the image screen starting at a first location where the slider is approximately displayed, and ending at a second location that indicates a change in the values of the viewing parameter;

graphically move the slider along the bar from the first location to approximately the second location in response to detecting the continuous physical contact;

respond to the continuous contact by adjusting the values of the viewing parameter based on the change.

6. The personal digital assistant of claim 5, wherein the more than approximately eighty percent of the pixels have a value of the viewing parameter corresponding to a first image screen drive voltage.

7. A method executed on a personal digital assistant for adjusting levels of a viewing parameter for an image screen disposed on the personal digital assistant, wherein the image screen includes pixels having output levels, the method comprising:

maintaining the personal digital assistant in a low power state until any one of a plurality of mechanical input mechanisms is actuated by user operation of said any one of the plurality of mechanical input mechanisms;

detecting a first input mechanism in the plurality of mechanical input mechanisms being actuated, the first input mechanism being previously associated with displaying one or more graphical user-interface elements;

in response to detecting the first input mechanism being actuated, then automatically performing steps (a)–(c):
(a) switching the personal digital assistant to an higher power state,
(b) displaying on at least a portion of the image screen a content from a previous use of an application on the personal digital assistant, and
(c) displaying one or more graphical user-interface elements for adjusting a value of a viewing parameter, the one or more graphical user-interface elements including a slider and a bar;

detecting continuous contact on the image screen corresponding to where the slider is being displayed, the continuous contact extending between a first location of the slider on the bar and a second location of the slider on the bar, the second location of the contact determining a new value for the viewing parameter;

adjusting the value of the viewing parameter for the image screen to the new value by adjusting drive voltages of the image screen to correspond to the new value for the viewing parameter, the pixels being receptive to the image screen drive voltages so that the pixel output levels respond to the adjusted voltages by providing an adjusted image;

wherein said personal digital assistant executes an operating system; and wherein a process, running on said personal digital assistant and executing under control of said operating system, causes the displaying of said graphical user-interface elements.

8. The method of claim 7, wherein displaying one or more graphical user-interface elements for adjusting a value of a viewing parameter includes enabling the slider to be moved to a plurality of positions, including the first location and the second location.

9. The method of claim 7, wherein displaying on at least a portion of the image screen a content from a previous use of an application on the personal digital assistant includes displaying a most recently displayed content of the application prior to the personal digital assistant being maintained in the low power state.

10. The method of claim 7, wherein displaying a most recently displayed content of the application prior to the personal digital assistant being in the low power state includes displaying a most recently displayed content prior to the personal digital assistant being maintained in the low power state.

11. A computer-readable medium carrying one or more sequences of instructions for adjusting levels of a viewing parameter for an image screen disposed on a personal digital assistant, wherein the image screen includes pixels having output levels, wherein execution of the one or more sequences of instructions by one or more processors of the personal digital assistant causes the one or more processors to perform the steps of:

detecting an activation signal for viewing a parameter control in response to user operation of a mechanical button disposed on the personal digital assistant;

in response to receiving the activation signal, displaying one or more graphical user-interface elements, the one or more graphical user-interface elements forming at least a portion of the parameter control on the image screen, the one or more graphical user-interface elements including a bar and a slider;

detecting an interaction between a user and the one or more graphical user-interface elements, the interaction corresponding to an adjustment of the viewing parameter from a prior value to a new value;

in response to detecting the interaction, adjusting the value of the viewing parameter for the image screen to the new value, wherein adjusting includes adjusting image screen drive voltages to adjusted voltages based on the new value, the pixels being receptive to the image screen drive voltages so that the pixel output levels respond to the adjusted voltages by providing an adjusted image having an adjusted contrast or brightness;

wherein detecting an interaction between a user and the one or more graphical user-interface elements includes detecting continuous contact on the image screen of a user-controlled object over the slider along the bar displayed on the image screen, from a first location corresponding to the prior value to a second location corresponding to the new value;

wherein said personal digital assistant executes an operating system; and wherein a process, running on said personal digital assistant and executing under control of said operating system, causes the displaying of said graphical user-interface elements.

12. The computer-readable medium of claim 11, wherein the image screen includes portions adapted for illumination by groups of pixels including a first portion configured for illumination by a first group of pixels;

wherein the adjusting includes:
maintaining the image screen drive voltages at low levels for one or more of the groups of pixels, and
adjusting the image screen drive voltages to adjusted voltages corresponding to the new value for the first group of pixels, the first portion covering less than approximately twenty-percent of the image screen; and wherein the one or more sequences of instructions include further one or more instructions for the personal digital assistant displaying selected information only on the first portion.

13. The computer-readable medium of claim 11, wherein in response to receiving the activation signal, displaying one or more graphical user-interface elements includes displaying an icon, and detecting an interaction between a user and the one or more graphical user-interface elements includes detecting the user contacting the icon after moving the slider to the second position; and wherein the one or more sequences of instructions includes one or more sequences of instructions for accepting the new value of the viewing parameter for adjusting image screen drive voltages only if the user contacts the icon.

14. The computer-readable medium of claim 11, wherein detecting an interaction between a user and the one or more graphical user-interface elements includes detecting the user contacting the bar either to a left side or right side of the slider, wherein contact to one of the left side or right side corresponds to the new value being less than the prior value, and contact to the other of the left side or right side corresponds to the new value being greater than the prior value.

15. A computer-readable medium carrying one or more sequences of instructions for adjusting levels of a viewing parameter for an image screen disposed on a personal digital assistant, wherein the image screen includes pixels having output levels, wherein execution of the one or more sequences of instructions by one or more processors of the personal digital assistant causes the one or more processors to perform the steps of:

maintaining the personal digital assistant in a low power state until any one of a plurality of mechanical input mechanisms is actuated by user operation of said any one of the plurality of mechanical input mechanisms;

detecting a first input mechanism in the plurality of mechanical input mechanisms being actuated, the first input mechanism being previously associated with displaying one or more graphical user-interface elements;

in response to detecting the first input mechanism being actuated, then automatically performing steps (a)–(c):

(a) switching the personal digital assistant to an higher power state, (b) displaying on at least a portion of the image screen a content from a previous use of an application on the personal digital assistant, and (c) displaying one or more graphical user-interface elements for adjusting a value of a viewing parameter, the one or more graphical user-interface elements including a slider and a bar;

detecting continuous contact on the image screen corresponding to where the slider is being displayed, the continuous contact extending between a first location of the slider on the bar and a second location of the slider on the bar, the second location of the contact determining a new value for the viewing parameter;

adjusting the value of the viewing parameter for the image screen to the new value by adjusting drive voltages of the image screen to correspond to the new value for the viewing parameter, the pixels being receptive to the image screen drive voltages so that the pixel output levels respond to the adjusted voltages by providing an adjusted image;

wherein said personal digital assistant executes an operating system; and wherein a process, running on said personal digital assistant and executing under control of said operating system, causes the displaying of said graphical user-interface elements.

16. The computer-readable medium of claim 15, wherein displaying one or more graphical user-interface elements for adjusting a value of a viewing parameter includes enabling the slider to be moved to a plurality of positions, including the first location and the second location.

17. The computer-readable medium of claim 15, wherein displaying on at least a portion of the image screen a content from a previous use of an application on the personal digital assistant includes displaying a most recently displayed content of the application prior to the personal digital assistant being maintained in the low power state.

18. The computer-readable medium of claim 15, wherein displaying a most recently displayed content of the application prior to the personal digital assistant being in the low power state includes displaying a most recently displayed content prior to the personal digital assistant being maintained in the low power state.

* * * * *